United States Patent

Shimizu et al.

(10) Patent No.: US 9,453,138 B2
(45) Date of Patent: Sep. 27, 2016

(54) INK, INK CARTRIDGE, AND INK JET RECORDING METHOD

(71) Applicant: CANON KABUSHIKI KAISHA, Tokyo (JP)

(72) Inventors: Yuhei Shimizu, Kawasaki (JP); Masayuki Ikegami, Atsugi (JP); Takashi Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/625,887

(22) Filed: Feb. 19, 2015

(65) Prior Publication Data

US 2015/0267065 A1 Sep. 24, 2015

(30) Foreign Application Priority Data

Mar. 24, 2014 (JP) .................................. 2014-060735

(51) Int. Cl.
*C09D 11/328* (2014.01)
*C09D 11/38* (2014.01)

(52) U.S. Cl.
CPC ............. *C09D 11/328* (2013.01); *C09D 11/38* (2013.01)

(58) Field of Classification Search
None
See application file for complete search history.

(56) References Cited

U.S. PATENT DOCUMENTS

| 7,004,579 B2 | 2/2006 | Sato et al. |
| 7,056,972 B2 | 6/2006 | Nakazawa et al. |

(Continued)

FOREIGN PATENT DOCUMENTS

| EP | 1 810 999 A1 | 7/2007 |
| EP | 2 650 334 A1 | 10/2013 |

(Continued)

OTHER PUBLICATIONS

Jun. 19, 2015 European Search Report in European Patent Appln. No. 15000520.5.

*Primary Examiner* — Stephen Meier
*Assistant Examiner* — Renee I Wilson
(74) *Attorney, Agent, or Firm* — Fitzpatrick, Cella, Harper & Scinto

(57) ABSTRACT

An ink for ink jet including a coloring material; and a water-soluble organic solvent. The coloring material contains a compound represented by the following general formula (I). The water-soluble organic solvent contains a compound represented by the following general formula (II) and a linear both-terminal alkanediol having 4 to 6 carbon atoms. The content A (mass %) of the compound represented by the following general formula (II) based on the total mass of the ink is 4.0-12.0 mass %, and the mass ratio (A/B) of the content A (mass %) to the content B (mass %) of the alkanediol based on the total mass of the ink is 2.5-4.0 times:

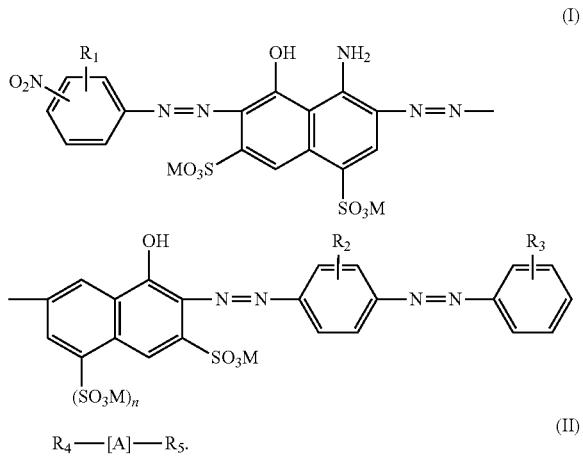

8 Claims, 2 Drawing Sheets

(56) References Cited

U.S. PATENT DOCUMENTS

| | | |
|---|---|---|
| 7,067,590 B2 | 6/2006 | Sato et al. |
| 7,151,156 B2 | 12/2006 | Sato et al. |
| 7,328,991 B2 | 2/2008 | Sato et al. |
| 7,423,075 B2 | 9/2008 | Ikegami et al. |
| 7,439,282 B2 | 10/2008 | Sato et al. |
| 7,442,753 B2 | 10/2008 | Tsubaki et al. |
| 7,449,513 B2 | 11/2008 | Sato et al. |
| 7,498,364 B2 | 3/2009 | Sato et al. |
| 7,503,965 B2 | 3/2009 | Matsui et al. |
| 7,503,967 B2 * | 3/2009 | Matsui ............... C09B 33/26 106/31.52 |
| 7,528,179 B2 | 5/2009 | Suda et al. |
| 7,538,147 B2 | 5/2009 | Sato et al. |
| 7,563,853 B2 | 7/2009 | Tsubaki et al. |
| 7,572,844 B2 | 8/2009 | Sato et al. |
| 7,598,332 B2 | 10/2009 | Ikegami et al. |
| 7,601,790 B2 | 10/2009 | Sato et al. |
| 7,629,427 B2 | 12/2009 | Sato et al. |
| 7,704,414 B2 | 4/2010 | Sato et al. |
| 7,866,806 B2 | 1/2011 | Sato et al. |
| 7,918,928 B2 | 4/2011 | Saito et al. |
| 8,029,612 B2 * | 10/2011 | Ishii ............... C09D 11/328 106/31.48 |
| 8,167,991 B2 | 5/2012 | Matsui et al. |
| 8,389,600 B2 | 3/2013 | Suzuki et al. |
| 8,408,691 B2 | 4/2013 | Koike et al. |
| 8,425,027 B2 | 4/2013 | Nishiwaki et al. |
| 8,450,393 B2 | 5/2013 | Tsubaki et al. |
| 8,469,504 B2 | 6/2013 | Saito et al. |
| 8,602,546 B2 | 12/2013 | Shimizu et al. |
| 8,602,547 B2 | 12/2013 | Nakata et al. |
| 8,871,013 B2 | 10/2014 | Sakai et al. |
| 8,882,255 B2 | 11/2014 | Nakazawa et al. |
| 8,932,394 B2 | 1/2015 | Kudo et al. |
| 8,986,435 B2 | 3/2015 | Saito et al. |
| 8,992,674 B2 | 3/2015 | Ikegami et al. |
| 2007/0227388 A1 | 10/2007 | Ohno et al. |
| 2008/0193660 A1 | 8/2008 | Matsui et al. |
| 2008/0292792 A1 | 11/2008 | Matsui et al. |
| 2009/0062545 A1 | 3/2009 | Matsui et al. |
| 2010/0034972 A1 | 2/2010 | Mukae et al. |
| 2011/0310162 A1 * | 12/2011 | Tamanuki ............... B41J 2/165 347/20 |
| 2013/0271540 A1 | 10/2013 | Saito et al. |
| 2013/0328973 A1 | 12/2013 | Kakikawa et al. |
| 2014/0043407 A1 | 2/2014 | Kudo et al. |

FOREIGN PATENT DOCUMENTS

| | | |
|---|---|---|
| EP | 2 674 462 A1 | 12/2013 |
| EP | 2 695 920 A1 | 2/2014 |
| JP | 2003-201412 A | 7/2003 |
| JP | 2013-072061 A | 4/2013 |
| WO | 2005/097912 A1 | 10/2005 |
| WO | 2005/108502 A1 | 11/2005 |
| WO | 2006/051850 A1 | 5/2006 |
| WO | 2007/077931 A1 | 7/2007 |

* cited by examiner

INK, INK CARTRIDGE, AND INK JET RECORDING METHOD

BACKGROUND OF THE INVENTION

1. Field of the Invention

The present invention relates to an ink, an ink cartridge, and an ink jet recording method.

2. Description of the Related Art

An ink jet recording method is a recording method involving applying a small ink droplet to a recording medium to form an image, and its popularization has been rapidly advancing in association with a reduction in its cost and an increase in recording speed. In general, a recorded product obtained by the ink jet recording method is inferior in image fastness compared with a silver halide photograph. In particular, when the recorded product is exposed to light, humidity, heat, or an environmental gas such as an ozone gas present in air for a long time period, the following problem arises. A coloring material of the recorded product deteriorates, and hence a change in color tone of its image or discoloration of the image is liable to occur.

Discoloration of an image recorded with an ink containing a black coloring material (black ink) often involves a change in its color tone due to the deterioration of the coloring material. In addition, the black ink is used in both of a monochromatic image and a full-color image, and in recent years, the ink has been required to be capable of recording an image having a high optical density not only when glossy paper is used but also when plain paper is used.

Polyazotization of a molecular structure of a black coloring material has been widely studied. For example, there are proposals concerning a trisazo compound having two naphthalene rings and a trisazo compound having a nitrogen-containing heterocycle (see Japanese Patent Application Laid-Open No. 2003-201412 and International Patent WO2007/077931A). In addition, there are proposals concerning a tetrakisazo compound having an electron-withdrawing group, a tetrakisazo compound having three naphthalene rings, and a tetrakisazo compound having a nitrogen-containing heterocycle (see International Patent WO2005/108502A, International Patent WO2005/097912A, International Patent WO2006/051850A, and Japanese Patent Application Laid-Open No. 2013-072061).

SUMMARY OF THE INVENTION

However, studies made by the inventors of the present invention have found that simultaneous achievement of the optical density and ozone resistance of an image recorded with an ink containing any one of the trisazo compounds proposed in Japanese Patent Application Laid-Open No. 2003-201412 and International Patent WO2007/077931A is insufficient. For example, the trisazo compound proposed in Japanese Patent Application Laid-Open No. 2003-201412 has two naphthalene rings in its molecular structure, and hence its conjugated system extends and the compound can absorb light in a longer wavelength region. Accordingly, the optical density of the image increases. However, the ozone resistance of the image becomes insufficient because an electron in a molecule of the compound is delocalized and hence the compound is liable to be oxidized.

In addition, the trisazo compound proposed in International Patent WO2007/077931A has a high oxidation potential because an electron-withdrawing nitrogen-containing heterocycle is introduced into the compound. Further, in that compound electron transfer is suppressed, and hence the compound is hardly oxidized and the ozone resistance of an image improves. However, the extension of its conjugated system is insufficient, and hence the long wavelength region of light that can be absorbed by the compound is narrowed and the optical density of the image becomes insufficient.

Meanwhile, it has been found that the optical density of an image recorded with an ink containing a tetrakisazo compound increases as compared to that of an image recorded with an ink containing a trisazo compound, but the optical density may vary depending on the molecular structure of the tetrakisazo compound. For example, the tetrakisazo compound proposed in International Patent WO2005/108502A has three naphthalene rings, and hence the compound has many n-electrons and its maximum absorption wavelength shifts to a longer wavelength region. Accordingly, the optical density of an image recorded with an ink containing the compound increases to some extent. However, the ozone resistance of the image becomes insufficient because electrons in a molecule of the compound are delocalized and hence the compound is liable to be oxidized.

In addition, the tetrakisazo compound proposed in International Patent WO2005/097912A has a nitrogen-containing heterocycle and hence the ozone resistance of an image recorded with an ink containing the compound improves. Further, the compound has many n-electrons and its maximum absorption wavelength shifts to a longer wavelength region, and hence the optical density of the image also increases to a small extent. However, even the optical density of the image recorded with the ink using the tetrakisazo compound proposed in International Patent WO2005/097912A has still been insufficient.

Some of the tetrakisazo compounds proposed in International Patent WO2006/051850A and Japanese Patent Application Laid-Open No. 2013-072061 have more n-electrons than a trisazo compound, and the maximum absorption wavelength of such compound shifts to a longer wavelength region. Accordingly, the optical density of an image recorded with an ink containing such compound easily increases to some extent. Further, when a compound having an electron-withdrawing group among the tetrakisazo compounds proposed in International Patent WO2006/051850A and Japanese Patent Application Laid-Open No. 2013-072061 is used, the ozone resistance of an image also improves. However, there has been room for improvement of the optical density of an image recorded with an ink using any one of the tetrakisazo compounds proposed in International Patent WO2006/051850A and Japanese Patent Application Laid-Open No. 2013-072061 has been susceptible to further improvement.

The inventors of the present invention have made studies on a compound having an electron-withdrawing group as a compound that easily improves ozone resistance among the tetrakisazo compounds proposed in International Patent WO2006/051850A and Japanese Patent Application Laid-Open No. 2013-072061, and in the process of the studies, have found a problem peculiar to the compound. The coloring material has a small number of aromatic rings and is free of any nitrogen-containing heterocycle. Accordingly, such coloring material hardly polarizes and hardly associates. The inventors have found, as a problem resulting from the foregoing, the fact that when an image recorded with an ink containing the compound is stored in a high-humidity environment, a phenomenon in which the coloring material exudes owing to moisture occurs, that is, the humidity resistance of the image reduces in some cases. In view of the foregoing, the inventors have made studies on an approach to improve the humidity resistance, and as a result, have found that the approach improves the humidity resistance but reduces the sticking resistance of the ink in some cases.

Therefore, an object of the present invention is to provide an ink that is excellent in sticking resistance and can record an image having a high optical density, and excellent in ozone resistance and humidity resistance. Another object of the present invention is to provide an ink cartridge and ink jet recording method using the ink.

The above-mentioned objects are achieved by the present invention described below. That is, according to an embodiment of the present invention, there is provided an ink for ink jet including a coloring material and a water-soluble organic solvent, in which the coloring material contains a compound represented by the following general formula (I); the water-soluble organic solvent contains a compound represented by the following general formula (II) and a linear both-terminal alkanediol having 4 to 6 carbon atoms; and a content A (mass %) of the compound represented by the following general formula (II) based on the total mass of the ink is 4.0 mass % or more and 12.0 mass % or less, and a mass ratio (A/B) of the content A (mass %) to a content B (mass %) of the alkanediol based on the total mass of the ink is 2.5 times or more and 4.0 times or less.

FIGS. 2A and 2B schematically illustrate an exemplary ink jet recording apparatus used in an ink jet recording method according to the present invention, in which FIG. 2A is a perspective view illustrating a principal part of the ink jet recording apparatus, and FIG. 2B is a perspective view illustrating a head cartridge.

DESCRIPTION OF THE EMBODIMENTS

The present invention is hereinafter described in more detail by way of preferred embodiments. It should be noted that in the present invention, when a compound is a salt, the expression "contains a salt" is used for the sake of convenience, though the salt is present in an ink while dissociating into ions. In addition, an ink for ink jet is sometimes simply described as "ink". In addition, in the present invention, even when a material is a solid at normal temperature (20 to 25° C.), the material is included in the category of a water-soluble organic solvent as long as the material can serve as a solvent for dissolving or dispersing a component such as a coloring material in the case where the material is dissolved in water to prepare an aqueous solution.

The molecular structure of a black coloring material and the optical density of an image may have such a relationship

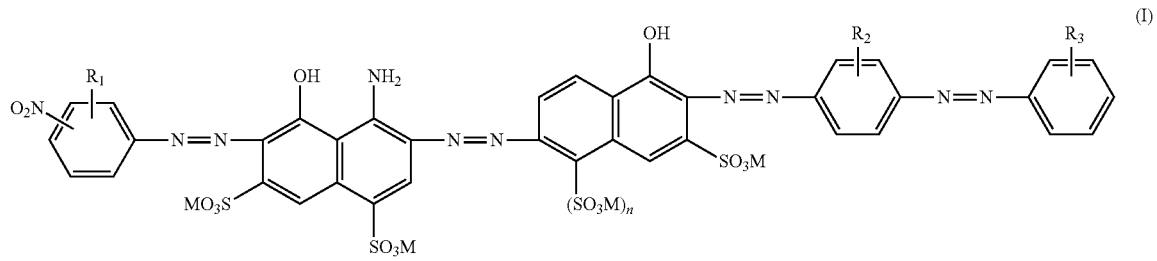

(In the general formula (I), $R_1$ and $R_3$ each independently represent a hydrogen atom, a halogen atom, a cyano group, a hydroxy group, a carboxylic acid group, a sulfonic acid group, a phosphonic acid group, a sulfamoyl group, an N-alkylaminosulfonyl group, an alkylsulfonyl group, a nitro group, an acyl group, a ureido group, an alkyl group, an alkoxy group, an acylamino group, or an alkylsulfonylamino group; $R_2$ represents a hydrogen atom or a sulfonic acid group; n represents 0 or 1; and M's each independently represent a hydrogen atom, an alkali metal, ammonium, or an organic ammonium.)

(In the general formula (II), -[A]- represents —S— or —S($=$O)$_2$—, and $R_4$ and $R_5$ each independently represent an alkyl group or a hydroxyalkyl group.)

According to one embodiment of the present invention, it is possible to provide the ink that is excellent in sticking resistance and can record an image having a high optical density, and excellent in ozone resistance and humidity resistance. According to another embodiment of the present invention, it is possible to provide the ink cartridge and ink jet recording method using the ink.

Further features of the present invention will become apparent from the following description of exemplary embodiments based on the attached drawings.

Figure 1:
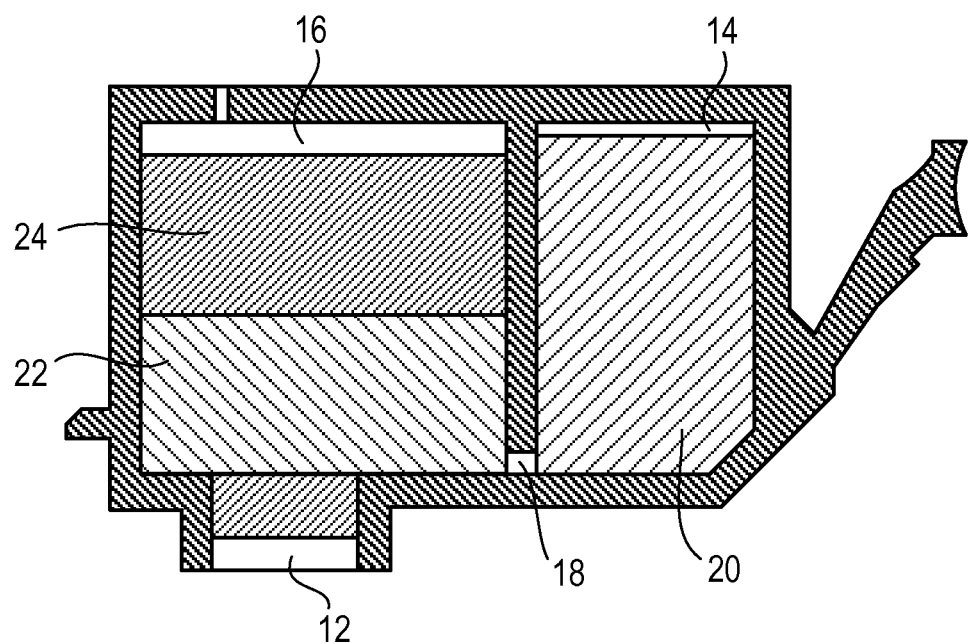
FIG. 1 is a sectional view schematically illustrating an ink cartridge according to an embodiment of the present invention.

as described below. In general, an image having a low reflectance for light in a visible light region (generally 380 to 830 nm) is easily recognized as having a high optical density. In addition, as represented by the "standard photopic spectral luminous efficiency curve" specified by the International Commission on Illumination (CIE), the wavelength at which a human being feels that an image is brightest, i.e., its optical density is low, is around 555 nm. That is, in order to increase the optical density of an image, it is important to use a black coloring material having a low reflectance for, in particular, light around 555 nm in the visible light region, i.e., having a high absorption characteristic around 555 nm. The maximum absorption wavelength of the tetrakisazo compounds having an electron-withdrawing group proposed in International Patent WO2006/051850A and Japanese Patent Application Laid-Open No. 2013-072061 is around 570 nm. On the other hand, the maximum absorption wavelength of the tetrakisazo compound having three naphthalene rings proposed in International Patent WO2005/108502A shifts to around 640 nm. Further, the maximum absorption wavelength of the tetrakisazo compound having a nitrogen-containing heterocycle proposed in International Patent WO2005/097912A is around 600 nm. Accordingly, it is assumed that when a compound represented by the general formula (I) (tetrakisazo compound having an electron-withdrawing group) is used, an image having a higher optical density than that in the case where another tetrakisazo compound is used can be recorded.

In a recording medium such as plain paper, a coloring material (dye) hardly remains near the surface of the recording medium and hence the optical density of an image is liable to look low. Accordingly, an improvement in color developability of the coloring material itself is important for an increase in optical density of an image recorded on the recording medium such as plain paper. In addition, in a recording medium such as glossy paper whose recorded image is often stored for a long time period, an improvement in ozone resistance of the image is important. An image excellent in ozone resistance and optical density can be recorded by using an ink containing the compound represented by the general formula (I) as a black coloring material. However, the inventors of the present invention made studies on an image recorded with the ink containing a compound represented by the general formula (I) and the reliability of the ink, and as a result, found that there were problems concerning the humidity resistance of the image and the sticking resistance of the ink as described in the foregoing.

The compound represented by the general formula (I) has a smaller number of aromatic rings than a tetrakisazo compound which is a conventional black coloring material, and no nitrogen-containing heterocycle is introduced into the compound. This is because the compound is designed so as to show such an absorption characteristic that its maximum absorption wavelength is around 555 nm in order that an image having a high optical density can be recorded. The compound represented by the general formula (T) hardly polarizes owing to such molecular design. Therefore, the compound represented by the general formula (I) hardly adsorbs to the cationic components of a recording medium (such as alumina and a hydrate thereof, a cationic resin, and a filler). In addition, the compound represented by the general formula (I) hardly associates. Accordingly, when an image recorded with an ink containing the compound represented by the general formula (I) is stored in a high-humidity environment, the coloring material is liable to move. As a result, a phenomenon in which the image blurs may occur.

Under such circumstances, the inventors of the present invention made studies for improving the humidity resistance of an image recorded with an ink containing the compound represented by the general formula (I). First, a plurality of inks containing different kinds of water-soluble organic solvents were prepared, images were recorded with the inks, and each of the resultant images was stored in a high-humidity environment. Then, blurring of the images before the storage and that after the storage were observed. As a result, it was found that the blurring of the image was suppressed when an alkanediol having 4 or more carbon atoms was used as a water-soluble organic solvent. The inventors of the present invention have further studies, and as a result, found that when an alkanediol having 4 or more carbon atoms and having hydroxy groups at both terminals of its linear hydrocarbon chain was used, an image improved in humidity resistance was able to be recorded while its optical density was prevented from reducing. The inventors of the present invention have assumed the reason for the foregoing to be as described below.

Even when the alkanediol having 4 or more carbon atoms is used in the ink containing the compound represented by the general formula (I), in the ink, the alkanediol having 4 or more carbon atoms, which is a water-soluble organic solvent having low polarity, acts on the compound represented by the general formula (I) to a small extent. However, after an image has been recorded on a recording medium, in association with evaporation of a liquid component such as water, the alkanediol is liable to be present near the compound represented by the general formula (I) by virtue of hydrophobic interaction. Accordingly, the amount of hydration water present near the compound represented by the general formula (I) reduces, and hence the compound destabilizes and the molecules of the compound aggregate to form a cluster. The cluster formed by the compound represented by the general formula (I) has a larger molecular size than that of the compound represented by the general, formula (I), and hence the cluster hardly moves in the recording medium. As a result, the humidity resistance of the image may improve.

On the other hand, when an alkanediol or alkanetriol having less than 4 carbon atoms is used as a water-soluble organic solvent, the polarity of the alkanediol is high, and hence a sufficient hydrophobic effect cannot be obtained and the compound represented by the general formula (I) hardly forms a cluster. Accordingly, the humidity resistance of an image may not improve. In addition, when such an alkanediol that hydroxy groups are not present at both terminals of its hydrocarbon chain or an alkanediol having a branched hydrocarbon chain is used, the permeability of the ink into the recording medium increases and hence the optical density of an image may reduce.

Next, the inventors of the present invention made various studies by using an ink containing, as a water-soluble organic solvent, only the alkanediol having 4 or more carbon atoms and having hydroxy groups at both terminals of its linear hydrocarbon chain. Specifically, the inventors made studies on recoverability required to enable normal ejection after the prepared ink was mounted on an ink jet recording apparatus and left to stand for a long time period. As a result, it was found that the recoverability was not good and normal ejection could not be performed in some cases. In addition, when an ejection orifice of a recording head that was unable to normally eject the ink was observed, the deposition of the coloring material was observed near the ejection orifice despite the fact that an ejection recovery operation was performed. That is, it was found that when the water-soluble organic solvent was selected and used only from the viewpoint that the solvent had an improving effect on the humidity resistance of an image, the sticking resistance of the ink remarkably reduced.

It should be noted that the expression "the sticking resistance of an ink is excellent" in the present invention means a small number of times of the ejection recovery operation needed for obviating clogging of the recording head due to, for example, the deposition of the coloring material near the ejection orifice, which is liable to occur in, for example, the case where the ink is left to stand for a long time period in a state of being mounted on the apparatus to thereby enable normal ejection. Accordingly, the "ink excellent in sticking resistance" can be normally ejected by a smaller number of times of the recovery operation.

In view of the foregoing, the inventors of the present invention made studies on a water-soluble organic solvent to be used in combination with the compound represented by the general formula (I) and the alkanediol having 4 or more carbon atoms and having hydroxy groups at both terminals of its linear hydrocarbon chain. As a result, the inventors found that when an ink containing the compound represented by the general formula (I) was prepared, a compound represented by the general formula (II) to be described later needed to be used in combination with the alkanediol.

A sulfur-containing compound like the compound represented by the general formula (II) generally shows a strong interaction with an aromatic ring having n-electrons. Specifically, a strong interaction occurs between the d orbital of the sulfur atom of the compound represented by the general formula (II) and n-electrons of the compound represented by the general formula (I). When the ink containing the compound represented by the general formula (I) and the alkanediol is left to stand for a long time period in a state of being mounted on the apparatus, a liquid component such as water evaporates near an ejection orifice and hence the compound represented by the general formula (I) forms a larger number of clusters. Here, in the case of an ink further containing the compound represented by the general formula (II), when the amount of the liquid component such as water near the ejection orifice is slight, the compound represented by the general formula (I) may adsorb to the clusters. As a result, growth of the clusters is suppressed and the compound represented by the general formula (II) is present between the formed clusters. Accordingly, even in the case where the compound represented by the general formula (I) is deposited, the aggregability of the deposit is low, and hence even when clogging occurs, the ink can be normally ejected by a smaller number of recovery operations.

In addition, the inventors made studies on the case where a water-soluble organic solvent such as glycerin, triethylene glycol, 2-pyrrolidone, or urea having high solubility for the compound represented by the general formula (I) was used instead of the compound represented by the general formula (II). As a result, it was found that its improving effect on the sticking resistance of an ink was smaller than that of the compound represented by the general formula (II). In particular, when a water-soluble organic solvent having high moisture-retaining ability such as urea is used in a large amount, the sticking resistance is improved but the humidity resistance of an image recorded with the ink becomes insufficient. This is because urea is liable to attract moisture in a high-humidity environment and hence the coloring material is liable to move owing to the moisture. It was found from the foregoing that the sticking resistance of the ink containing the compound represented by the general formula (I) was not improved only by improving the solubility for the compound represented by the general formula (I). In addition, it was found that it was important to use a water-soluble organic solvent capable of suppressing the growth of a cluster by strongly interacting with the compound represented by the general formula (I).

The inventors of the present invention have made further studies taking the conclusions obtained so far into consideration, and as a result, have found that the following construction is important. That is, the inventors have found that both of the humidity resistance of an image and the sticking resistance of an ink can be achieved by using the compound represented by the general formula (II) and a linear both-terminal alkanediol having 4 to 6 carbon atoms in combination at appropriate contents and an appropriate mass ratio. Specifically, the inventors have found that it is sufficient that a content A (mass %) of the compound represented by the general formula (II) be 4.0 mass % or more and 12.0 mass % or less, and the mass ratio (A/B) of the content A (mass %) to a content B (mass %) of the alkanediol be 2.5 times or more and 4.0 times or less.

When the content A (mass %) of the compound represented by the general formula (II) is less than 4.0 mass %, the adsorption of the compound represented by the general formula (I) to a cluster becomes insufficient. Accordingly, the growth of the cluster cannot be suppressed and hence the sticking resistance of the ink becomes insufficient. On the other hand, when the content A (mass %) of the compound represented by the general formula (II) is more than 12.0 mass %, the sticking resistance of the ink is sufficient but the clustering of the compound represented by the general formula (I) is inhibited by the alkanediol. Accordingly, the humidity resistance of the image becomes insufficient.

In addition, when the mass ratio (A/B) of the content A (mass %) of the compound represented by the general formula (II) to the content B (mass %) of the alkanediol is less than 2.5 times, the growth of a cluster cannot be suppressed and hence the sticking resistance of the ink becomes insufficient. On the other hand, when the mass ratio (A/B) of the content A (mass %) of the compound represented by the general formula (II) to the content B (mass %) of the alkanediol is more than 4.0 times, the clustering of the compound represented by the general formula (I) is inhibited by the alkanediol. Accordingly, the humidity resistance of the image becomes insufficient.

Further, when a linear both-terminal alkanediol having more than 6 carbon atoms is used instead of the linear both-terminal alkanediol having 4 to 6 carbon atoms, the cluster formation of the compound represented by the general formula (I) is accelerated and hence the sticking resistance of the ink becomes insufficient.

It should be noted that it was found that even when the compound represented by the general formula (II) and the linear both-terminal alkanediol having 4 to 6 carbon atoms were used at appropriate contents and an appropriate mass ratio, the sticking resistance was insufficient in the case where the tetrakisazo compound having an electron-withdrawing group proposed in Japanese Patent Application Laid-Open No. 2013-072061 was used. This is probably because the growth of a cluster is liable to progress abruptly owing to the structure of the tetrakisazo compound.

Ink

Constituent components of an ink of the present invention and the physical properties of the ink are hereinafter described in detail.

Coloring Material

Compound represented by General Formula (I)

The ink for ink jet of the present invention contains a coloring material (dye) containing a compound represented by the following general formula (I). A content C (mass %) of the compound represented by the general formula (I) in the ink is preferably 0.1 mass % or more and 10.0 mass % or less, more preferably 1.0 mass % or more and 6.0 mass % or less, particularly preferably 3.6 mass % or more and 6.0 mass % or less based on the total mass of the ink.

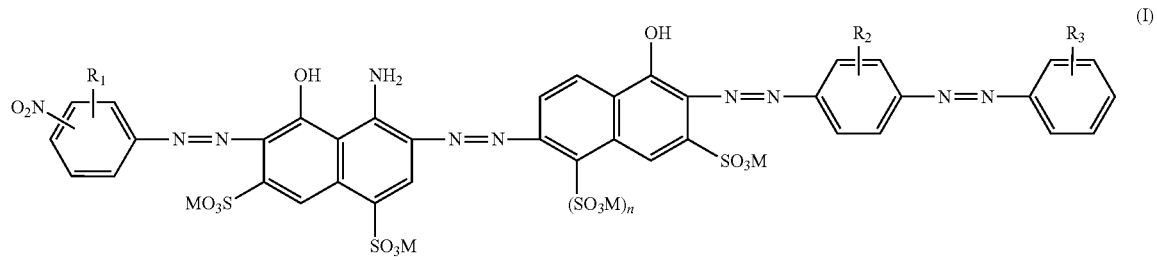

(I)

In the general formula (I), $R_1$ and $R_3$ each independently represent a hydrogen atom, a halogen atom, a cyano group, a hydroxy group, a carboxylic acid group, a sulfonic acid group, a phosphonic acid group, a sulfamoyl group, an N-alkylaminosulfonyl group, an alkylsulfonyl group, a nitro group, an acyl group, a ureido group, an alkyl group, an alkoxy group, an acylamino group, or an alkylsulfonylamino group.

Examples of the halogen atom can include a fluorine atom, a chlorine atom, a bromine atom, and an iodine atom.

The alkyl group in the N-alkylaminosulfonyl group preferably has 1 to 4 carbon atoms. Examples of the N-alkylaminosulfonyl group can include an N-methylaminosulfonyl group, an N-ethylaminosulfonyl group, an N-(n-butyl)aminosulfonyl group, an N,N-dimethylaminosulfonyl group, and an N,N-di(n-propyl)aminosulfonyl group.

A substituted or unsubstituted alkylsulfonyl group is included in the category of the alkylsulfonyl group. The alkyl group in the alkylsulfonyl group preferably has 1 to 4 carbon atoms. In addition, for example, a hydroxy group may be mentioned as a substituent thereof. Examples of the alkylsulfonyl group include unsubstituted alkylsulfonyl groups such as methylsulfonyl, ethylsulfonyl, propylsulfonyl, and butylsulfonyl; and substituted alkylsulfonyl groups such as hydroxyethylsulfonyl and 2-hydroxypropylsulfonyl.

An aliphatic acyl group is included in the category of the acyl group. The alkyl group in the acyl group preferably has 1 to 4 carbon atoms. Examples of the acyl group can include acetyl, propionyl, butyryl, and isobutyryl.

A substituted or unsubstituted alkyl group, and a linear or branched alkyl group are included in the category of the alkyl group. The alkyl group preferably has 1 to 4 carbon atoms. In addition, for example, a hydroxy group or an alkoxy group (preferably has 1 to 4 carbon atoms) may be mentioned as a substituent thereof. Examples of the alkyl group can include unsubstituted alkyl groups such as methyl, ethyl, n-propyl, isopropyl, n-butyl, isobutyl, sec-butyl, and tert-butyl; and substituted alkyl groups such as 2-hydroxyethyl, 2-hydroxypropyl, 3-hydroxypropyl, methoxyethyl, 2-ethoxyethyl, n-propoxyethyl, isopropoxyethyl, n-butoxyethyl, methoxypropyl, ethoxypropyl, n-propoxypropyl, isopropoxybutyl, and n-propoxybutyl.

A substituted or unsubstituted alkoxy group is included in the category of the alkoxy group. The alkoxy group preferably has 1 to 4 carbon atoms. For example, a hydroxy group, a sulfonic acid group, or a carboxylic acid group may be mentioned as a substituent thereof. Examples of the alkoxy group can include unsubstituted alkoxy groups such as methoxy, ethoxy, n-propoxy, isopropoxy, n-butoxy, sec-butoxy, and tert-butoxy; and substituted alkoxy groups such as 2-hydroxyethoxy, 2-hydroxypropoxy, 3-hydroxypropoxy, methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy, n-propoxybutoxy, 2-hydroxyethoxyethoxy, carboxymethoxy, 2-carboxyethoxy, 3-carboxypropoxy, 3-sulfopropoxy, and 4-sulfobutoxy.

An aliphatic acylamino group is included in the category of the acylamino group. The alkyl group in the acylamino group preferably has 1 to 4 carbon atoms. Examples of the acylamino group can include acetylamino, propionylamino, butyrylamino, and isobutyrylamino.

The alkylsulfonylamino group preferably has 1 to 4 carbon atoms. Examples of the alkylsulfonylamino group can include methylsulfonylamino, ethylsulfonylamino, and propylsulfonylamino.

In the general formula (I), $R_2$ represents a hydrogen atom or a sulfonic acid group.

In the general formula (I), n represents 0 or 1. The case where n represents 0 means that no sulfonic acid group is bonded at the corresponding position in the general formula (I), and a hydrogen atom is bonded at that position instead of the sulfonic acid group.

In the general formula (I), M's each independently represent a hydrogen atom, an alkali metal, ammonium, or an organic ammonium. Examples of the alkali metal can include lithium, sodium, and potassium. Examples of the organic ammonium can include an alkylamine having 1 or more and 3 or less carbon atoms such as methylamine or ethylamine; and a mono-, di-, or trialkanolamine having 1 or more and 4 or less carbon atoms such as monoethanolamine, diethanolamine, triethanolamine, monoisopropanolamine, diisopropanolamine, or triisopropanolamine. In the present invention, it is preferred that all M's in the general formula (I) represent sodium.

It should be noted that the carboxylic acid group, the sulfonic acid group, and the phosphonic acid group may be of free acid forms (H forms) or may be of salt forms. A counter ion in the case where the carboxylic acid group or the like is of a salt form (forms a salt) can be, for example, a cation of an alkali metal, ammonium, or an organic ammonium.

The compound represented by the general formula (I) is preferably a compound represented by the following general formula (III). Of the compounds represented by the general formula (I), the compound represented by the general formula (III) has high solubility. Accordingly, the compound represented by the general formula (III) can additionally improve the sticking resistance of the ink.

(III)

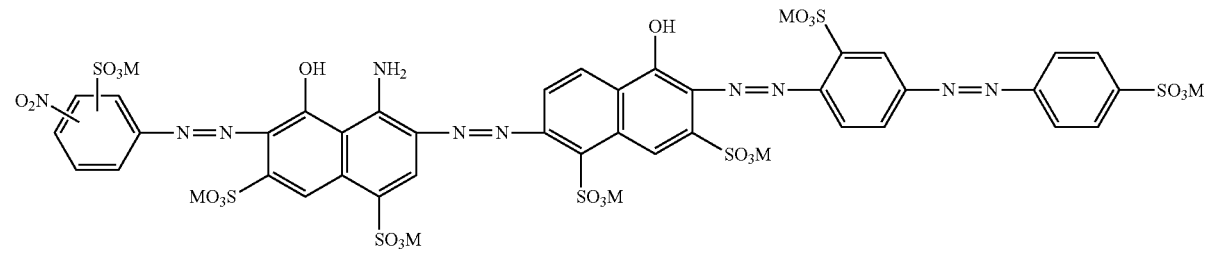

In the general formula (III), M's each independently represent a hydrogen atom, an alkali metal, ammonium, or an organic ammonium. Suitable examples of the compound represented by the general formula (I) that are represented in free acid forms can include Exemplified Compounds 1 to 7 shown below. Needless to say, in the present invention, the compound represented by the general formula (I) is not limited to the following exemplified compounds and any other compound is usable as long as the compound is included in the structure of the general formula (I) and the definition thereof. In the present invention, Exemplified Compounds 1 and 3 of the following exemplified compounds are preferred, and Exemplified Compound 1 is more preferred.

Exemplified Compound 1
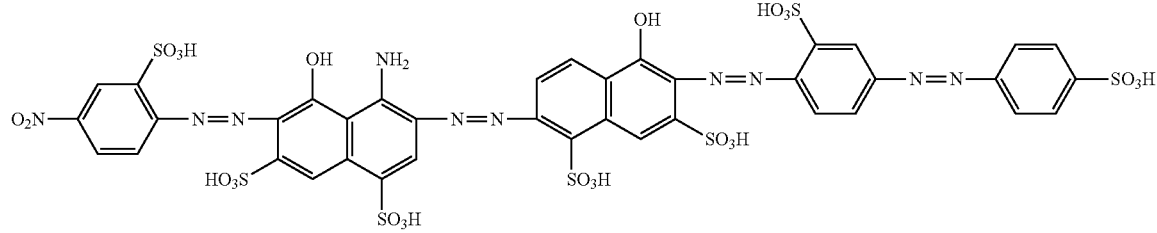

Exemplified Compound 2
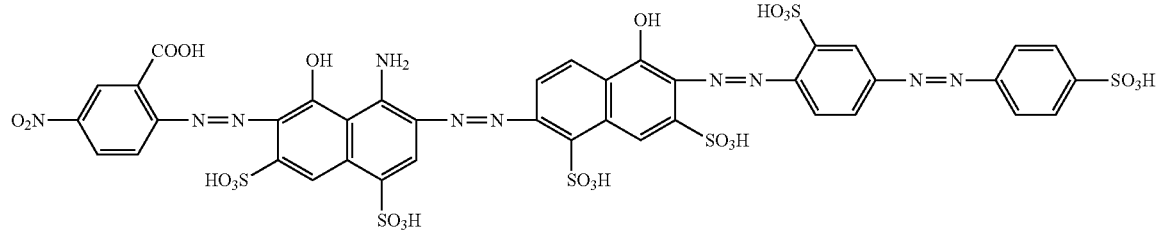

Exemplified Compound 3
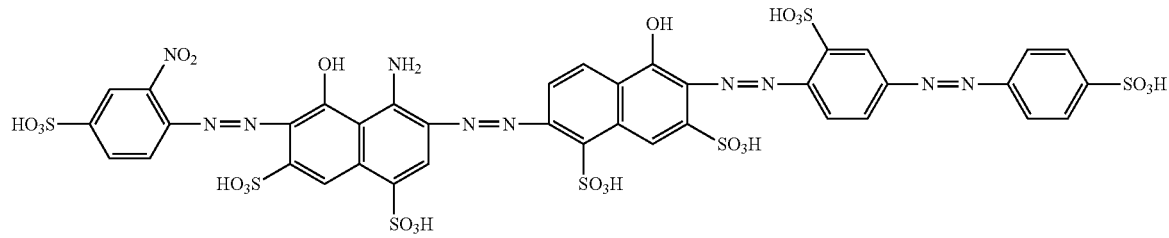

Exemplified Compound 4
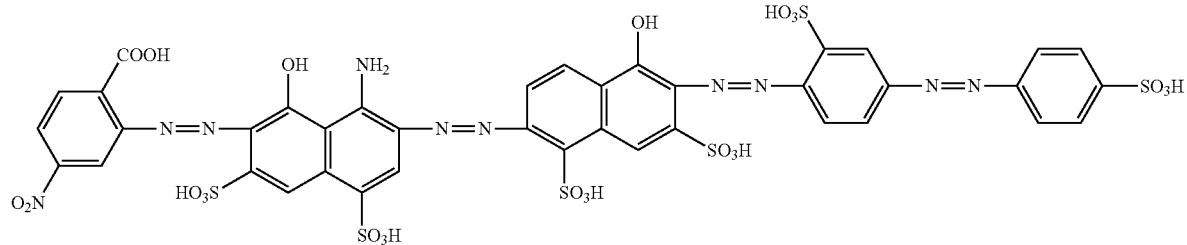

Exemplified Compound 5
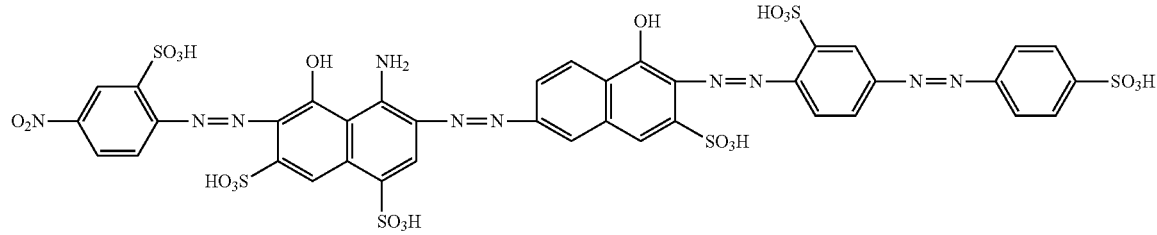

Exemplified Compound 6

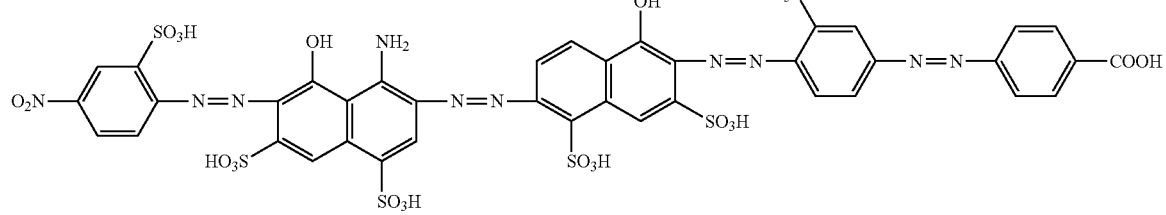

Exemplified Compound 7

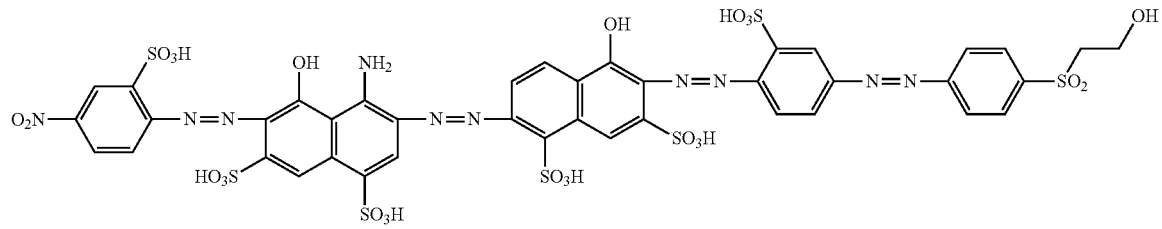

The content of the compound represented by the general formula (I) based on the total mass of the ink is referred to as "content C (mass %)." In addition, the content of a compound represented by the general formula (II) based on the total mass of the ink is referred to as "content A (mass %)." Further, the content of a specific alkanediol based on the total mass of the ink is referred to as "content B (mass %)." In this case, the mass ratio (C/(A+B)) of the content C (mass %) to the sum of the content A (mass %) and the content B (mass %) is preferably 0.15 times or more and 1.00 times or less. When the ratio C/(A+B) is less than 0.15 times, the compound represented by the general formula (I) does not sufficiently form a cluster and hence an improving effect on the humidity resistance of an image weakens in some cases. On the other hand, when the ratio C/(A+B) is more than 1.00 times, the growth of the cluster cannot be completely suppressed and hence the sticking resistance of the ink reduces in some cases.

Other Coloring Material

The ink of the present invention can contain other coloring materials in addition to the compound represented by the general formula (I). A coloring material having any one of the hues classified into, for example, cyan, magenta, yellow, red, blue, green, and black hues may be used as such coloring material. Dyes are preferred as the other coloring materials, an anionic dye is, inter alia, particularly preferred. When other coloring materials are used, the proportion of the content (mass %) of the compound represented by the general formula (I) in the ink with respect to all coloring materials is preferably 50.0% by mass or more, more preferably 72.0% by mass or more. In addition, the proportion is preferably 95.0% by mass or less, more preferably 78.0% by mass or less. Adopting such proportion can provide a neutral color tone preferred for a black ink.

In addition, other coloring materials (dyes) are preferably a compound represented by the following general formula (IV). The content (mass %) of the compound represented by the general formula (IV) based on the total mass of the ink is preferably 0.1 mass % or more and 10.0 mass % or less, more preferably 1.0 mass % or more and 6.0 mass % or less. In addition, when the compound represented by the general formula (I) and the compound represented by the general formula (IV) are used as coloring materials, the content of each coloring material is preferably set as described below. That is, the total content (mass %) of the compound represented by the general formula (I) and the compound represented by the general formula (IV) based on the total mass of the ink is preferably 0.1 mass % or more and 10.0 mass % or less, more preferably 1.0 mass % or more and 6.0 mass % or less. The mass ratio (C/D) of the content C (mass %) of the compound represented by the general formula (I) based on the total mass of the ink to a content D (mass %) of the compound represented by the general formula (IV) based on the total mass of the ink is preferably 0.8 times or more and 18.0 times or less, more preferably 1.0 times or more and 5.0 times or less, particularly preferably 1.5 times or more and 3.5 times or less.

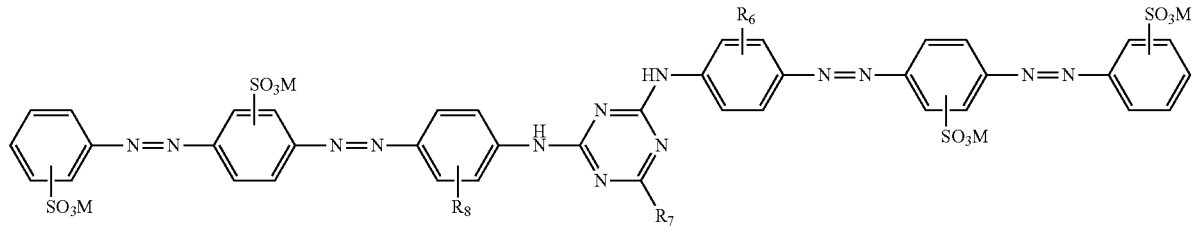
(IV)

The use of the compound represented by the general formula (IV) can additionally improve the sticking resistance of the ink as compared to that in the case where only the compound represented by the general formula (I) is used as a coloring material. The inventors of the present invention have assumed the reason for the foregoing to be as described below. In association with the evaporation of a liquid component such as water from the ink, the compound represented by the general formula (I) forms clusters. Further, the formed clusters are attracted with each other and then the compound is deposited. In the course of these processes, it is assumed that the compound represented by the general formula (IV) having a skeleton similar to that of the compound represented by the general formula (I) is oriented toward a cluster of the compound represented by the general formula (I). As a result, even when the compound represented by the general formula (I) is deposited, the deposit has low aggregability and the ejection of the ink is recovered to a normal state by a small number of recovery operations.

diethanolamine, triethanolamine, monoisopropanolamine, diisopropanolamine, or triisopropanolamine.

It should be noted that the carboxylic acid group and the sulfonic acid group may be of free acid forms (H forms) or may be of salt forms. A counter ion in the case where any such group forms a salt can be, for example, a cation of an alkali metal, ammonium, or an organic ammonium.

Suitable examples of the compound represented by the general formula (IV) that are represented in free acid forms can include Exemplified Compounds 8 to 19 in which $R_7$ in the following general formula (IV') represents an aliphatic amine residue shown in Table 1. Needless to say, in the present invention, the compound represented by the general formula (IV) is not limited to the following exemplified compounds and any other compound is usable as long as the compound is included in the structure of the general formula (IV) and the definition thereof. In the present invention, Exemplified Compounds 8, 12, and 16 of the following exemplified compounds are preferred.

(IV')

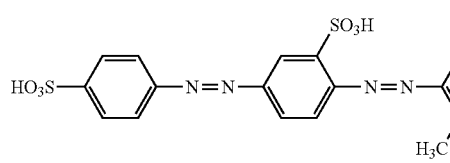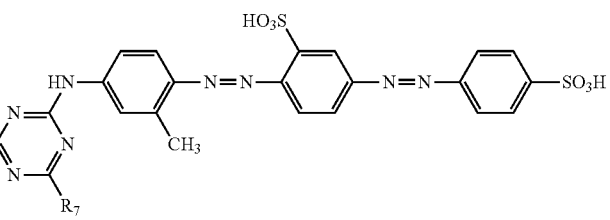

In the general formula (IV), $R_6$'s each independently represent a hydrogen atom or an alkyl group. A substituted or unsubstituted alkyl group, and a linear or branched alkyl group are included in the category of the alkyl group. The alkyl group preferably has 1 to 4 carbon atoms. In addition, for example, a hydroxy group or an alkoxy group (preferably has 1 to 4 carbon atoms) may be mentioned as a substituent thereof. Examples of the alkyl group can include unsubstituted alkyl groups such as methyl, ethyl, n-propyl, isopropyl, n-butyl, isobutyl, sec-butyl, and tert-butyl; and substituted alkyl groups such as 2-hydroxyethyl, 2-hydroxypropyl, 3-hydroxypropyl, methoxyethyl, 2-ethoxyethyl, n-propoxyethyl, isopropoxyethyl, n-butoxyethyl, methoxypropyl, ethoxypropyl, n-propoxypropyl, isopropoxybutyl, and n-propoxybutyl.

In the general formula (IV), $R_7$ represents an aliphatic amine residue having at least one of a carboxylic acid group and a sulfonic acid group. Examples of the aliphatic amine residue include aliphatic amine residues obtained by substituting an amine residue whose alkyl group has 1 to 5 carbon atoms with at least one of a carboxylic acid group and a sulfonic acid group. Of those, a monoalkylamine residue, a dialkylamine residue, or the like is preferred. Examples of the aliphatic amine residue having at least one of a carboxylic acid group and a sulfonic acid group can include an amino-alkylcarboxylic acid having 1 to 5 carbon atoms, a diimino-alkylcarboxylic acid having 1 to 5 carbon atoms, an amino-alkylsulfonic acid having 1 to 5 carbon atoms, and a diimino-alkylsulfonic acid having 1 to 5 carbon atoms.

In the general formula (IV), M's each independently represent a hydrogen atom, an alkali metal, ammonium, or an organic ammonium. Examples of the alkali metal can include lithium, sodium, and potassium. Examples of the organic ammonium can include an alkylamine having 1 or more and 3 or less carbon atoms such as methylamine or ethylamine; and a mono-, di-, or trialkanolamine having 1 or more and 4 or less carbon atoms such as monoethanolamine,

TABLE 1

Exemplified Compounds of Compound represented by General Formula (IV)

| Exemplified Compound | $R_7$ |
|---|---|
| 8 | $NH(CH_2)_2SO_3H$ |
| 9 | $N((CH_2)_2COOH)_2$ |
| 10 | $NH(CH_2)_2COOH$ |
| 11 | $NH(CH_2)_5COOH$ |
| 12 | $NHCH_2SO_3H$ |
| 13 | $N(CH_2SO_3H)_2$ |
| 14 | $N((CH_2)_2SO_3H)_2$ |
| 15 | $NHCH_2COOH$ |
| 16 | $N(CH_2COOH)_2$ |
| 17 | $NH((CH_2)_3COOH)_2$ |
| 18 | $NH(CH_2)_3SO_3H$ |
| 19 | $NH((CH_2)_3SO_3H)_2$ |

Compound Represented by General Formula (II)

The ink of the present invention contains a water-soluble organic solvent containing a compound represented by the following general formula (II). The content A (mass %) of the compound represented by the general formula (II) based on the total mass of the ink is 4.0 mass % or more and 12.0 mass % or less, preferably 8.0 mass % or more and 12.0 mass % or less.

$$R_4\text{-}[A]\text{-}R_5 \qquad (II)$$

In the general formula (II), -[A]-represents —S— or —S(=O)$_2$—. In addition, in the general formula (II), $R_4$ and $R_5$ each independently represent an alkyl group or a hydroxyalkyl group. A linear or branched alkyl group is included in the category of the alkyl group. The alkyl group preferably has 1 to 4 carbon atoms. Examples of the alkyl group can include methyl, ethyl, n-propyl, isopropyl, n-butyl, isobutyl, sec-butyl, and tert-butyl. In addition, a linear or branched hydroxyalkyl group is included in the category of the hydroxyalkyl group. The hydroxyalkyl group preferably has 1 to 4 carbon atoms. Examples of the hydroxyalkyl group can include a hydroxymethyl group, a hydroxyethyl group, a hydroxypropyl group, and a hydroxybutyl group.

Specific examples of the compound represented by the general formula (II) can include dimethyl sulfone, (2-hydroxyethyl)methyl sulfone, thiodiglycol, bis(2-hydroxyethyl)sulfoxide, and bis(2-hydroxyethyl)sulfone. In the present invention, bis(2-hydroxyethyl)sulfone is preferably used as the compound represented by the general formula (II). Bis(2-hydroxyethyl)sulfone has a sulfonyl group having a particularly high electron-withdrawing property, and hence in the course of processes in which the compound represented by the general formula (I) forms a cluster to be deposited, bis(2-hydroxyethyl)sulfone has particularly high adsorptivity to the cluster. Accordingly, even when the compound is deposited, the deposit has low aggregability and hence the ejection of the ink can be recovered to a normal state by a small number of recovery operations.

Linear Both-Terminal Alkanediol Having 4 to 6 Carbon Atoms

The water-soluble organic solvent to be incorporated into the ink of the present invention contains a linear both-terminal alkanediol having 4 to 6 carbon atoms (hereinafter sometimes written as "specific alkanediol") in addition to the compound represented by the general formula (II). The content B (mass %) of the specific alkanediol based on the total, mass of the ink is preferably 1.0 mass % or more and 5.0 mass % or less.

Examples of the specific alkanediol can include 1,4-butanediol, 1,5-pentanediol, and 1,6-hexanediol. Of those, 1,5-pentanediol is preferred. The use of 1,5-pentanediol can provide an ink capable of recording an image having an additionally high optical density. The inventors of the present invention have assumed the reason for the foregoing to be as described below.

As described in the foregoing, in association with a reduction in the amount of a liquid component such as water in the ink, the specific alkanediol is present near the compound represented by the general formula (I) to accelerate the formation of a cluster of the compound represented by the general formula (I). As the number of carbon atoms of the alkanediol increases and its hydrophobicity becomes higher, an accelerating effect on the formation of the cluster of the compound represented by the general formula (I) enlarges. However, the alkanediol supposedly adsorbs to the compound represented by the general formula (I) and hence the hydrophilicity of the compound represented by the general formula (I) increases. As a result, when an image is recorded with such ink, the compound represented by the general formula (I) permeates a recording medium and hence the optical density of the image may reduce. On the other hand, as the number of carbon atoms of the alkanediol reduces and the hydrophobicity becomes lower, the accelerating effect on the formation of the cluster of the compound represented by the general formula (I) becomes smaller, and hence the humidity resistance of the image tends to reduce. In view of the foregoing, 1,5-pentanediol among the specific alkanediols is present at a suitable position with respect to the compound represented by the general formula (I), and hence 1,5-pentanediol may be able to improve the humidity resistance of the image without reducing its optical density.

It should be noted that in the case where any one of the trisazo compounds proposed in International Patent WO2005/108502A and International Patent WO2005/097912A is used as a coloring material, even when 1,5-pentanediol is used in combination as a water-soluble organic solvent, 1,5-pentanediol is liable to adsorb to such coloring material and hence the optical density of the image reduces. That is, 1,5-pentanediol exhibits the peculiar effect when 1,5-pentanediol is combined with the compound represented by the general formula (I).

Aqueous Medium

An aqueous medium that is water or a mixed solvent of water and a water-soluble organic solvent can be used in the ink of the present invention. In the present invention, an aqueous ink containing at least water as an aqueous medium is preferred. Deionized water (ion-exchanged water) is preferably used as the water. A water content (mass %) in the ink is preferably 10.0 mass % or more and 90.0 mass % or less based on the total mass of the ink.

The water-soluble organic solvent is not particularly limited as long as the solvent is water-soluble, and an alcohol, a polyhydric alcohol, a polyglycol, a glycol ether, a nitrogen-containing polar solvent, a sulfur-containing polar solvent, or the like can be used in addition to the alkanediol and the compound represented by the general formula (II). The content (mass %) of the water-soluble organic solvent in the ink is preferably 5.0 mass % or more and 90.0 mass % or less, more preferably 10.0 mass % or more and 50.0 mass % or less based on the total mass of the ink. It should be noted that the content of the water-soluble organic solvent is a value including the contents of the compound represented by the general formula (II) and the linear both-terminal alkanediol having 4 to 6 carbon atoms. When the content of the water-soluble organic solvent deviates from that range, a high level of ejection stability of the ink is not sufficiently obtained in some cases.

Other Additive

In addition to the above-described components, the ink of the present invention may contain various additives such as a surfactant, a pH adjuster, a rust preventive, an antiseptic, an anti-mold agent, an antioxidant, a reduction inhibitor, a vaporization accelerator, a chelating agent, and a water-soluble resin as required.

Other Ink

The ink of the present invention and another ink having a hue different from that of the ink of the present invention can be used in combination for forming, for example, a full-color image. Such another ink can be, for example, at least one kind of ink selected from the group consisting of a black ink, a cyan ink, a magenta ink, a yellow ink, a red ink, a green ink, and a blue ink. In addition, the so-called light-color ink having substantially the same hue as that of such ink can be further used in combination. A coloring material to be used in such another ink or the light-color ink may be a known dye or may be a newly synthesized dye.

Physical Properties of Ink

The surface tension of the ink of the present invention at 25° C. is preferably 10 mN/m or more and 60 mN/m or less, more preferably 20 mN/m or more and 60 mN/m or less, particularly preferably 30 mN/m or more and 40 mN/m or less. Setting the surface tension of the ink within that range can effectively suppress the occurrence of, for example, irregular ejection (deviation of a point where the ink should impact) due to the wetting of the vicinity of an ejection orifice upon application of the ink to an ink jet system. The surface tension of the ink can be adjusted by appropriately setting the content of, for example, a surfactant or the water-soluble organic solvent in the ink. In addition, the viscosity of the ink is preferably adjusted so that a good ejection characteristic can be obtained upon ejection of the ink from an ejection orifice of a recording head of the ink jet system. The viscosity of the ink of the present invention at 25° C. is preferably 1.0 mPa·s or more and 5.0 mPa·s or less, more preferably 1.0 mPa·s or more and 3.0 mPa·s or less.

Ink Cartridge

The ink cartridge according to the present invention is provided with an ink and an ink storage portion storing this ink. The ink stored in the ink storage portion is the above-described ink according to the present invention. FIG. 1 is a sectional view schematically illustrating an ink cartridge according to an embodiment of the present invention. As illustrated in FIG. 1, an ink supply port 12 for supplying an ink to a recording head is provided in a bottom of the ink cartridge. The interior of the ink cartridge is the ink storage portion storing the ink. The ink storage portion is made up by an ink storage chamber 14 and an absorber storage chamber 16, and these chambers are communicated with each other through a communication port 18. The absorber storage chamber 16 is communicated with the ink supply port 12. A liquid ink 20 is stored in the ink storage chamber 14, and absorbers 22 and 24 holding the ink in an impregnated state are stored in the absorber storage chamber 16. The ink storage portion may also be so constructed that the whole amount of the ink stored is held by the absorber without providing the ink storage chamber. In addition, the ink storage portion may also be so constructed that the whole amount of the ink is stored in a liquid state without having the absorber. Further, the ink cartridge may also be constructed so as to have an ink storage portion and a recording head.

Ink Jet Recording Method

The ink jet recording method according to the present invention is a method of ejecting the above-described ink according to the present invention by a recording head of an ink jet system to record an image on a recording medium. Systems for ejecting the ink include a system in which mechanical energy is applied to the ink and a system in which thermal energy is applied to the ink. In the present invention, the system in which the thermal energy is applied to the ink to eject the ink is particularly favorably adopted. Steps of the ink jet recording method may be those publicly known except that the ink according to the present invention is used.

Figure 2A:
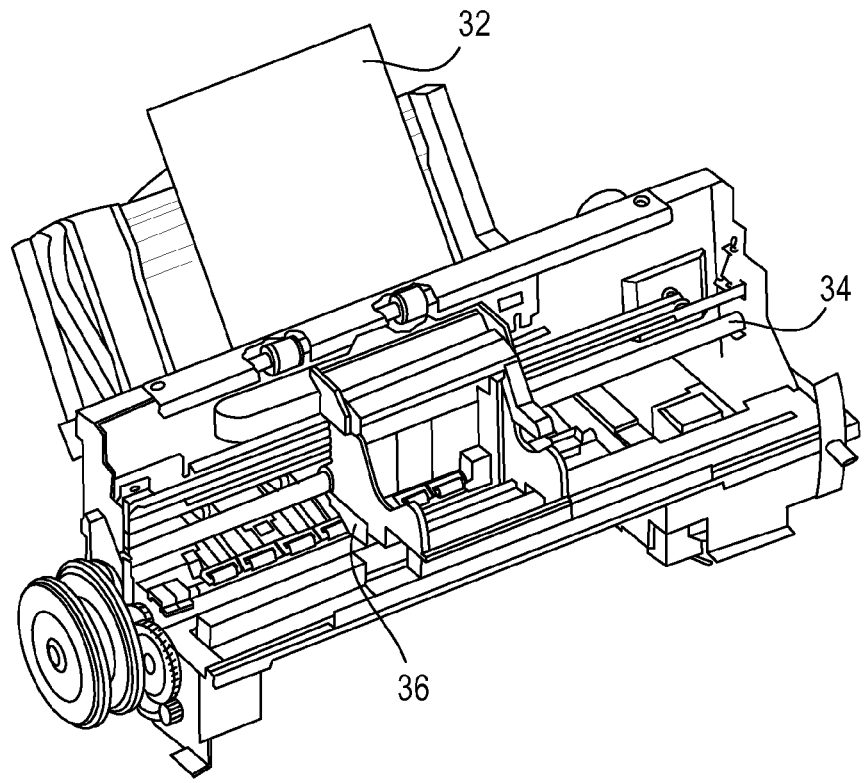
Figure 2B:
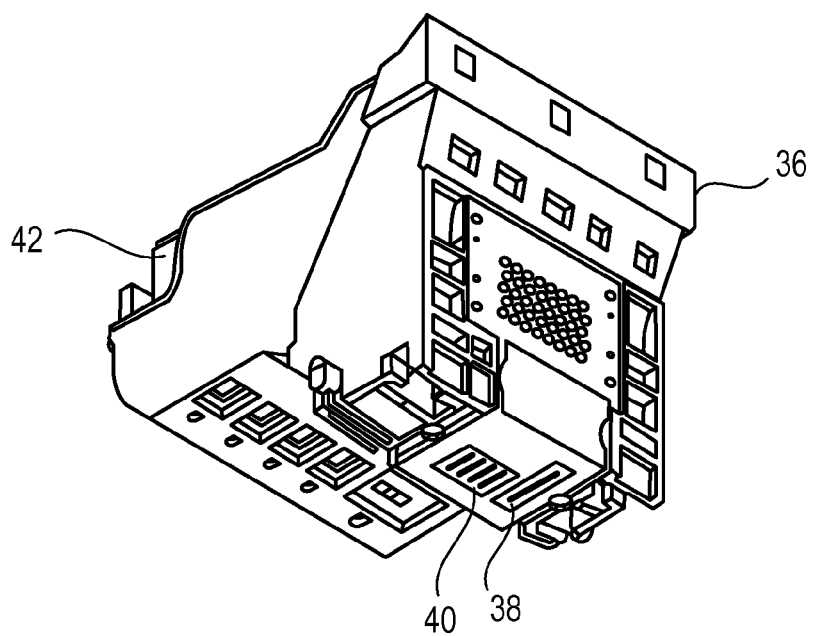

FIGS. 2A and 2B schematically illustrate an exemplary ink jet recording apparatus used in the ink jet recording method according to the present invention, in which FIG. 2A is a perspective view illustrating a principal part of the ink jet recording apparatus, and FIG. 2B is a perspective view illustrating a head cartridge. In the ink jet recording apparatus, a conveyance unit (not illustrated) for conveying a recording medium 32 and a carriage shaft 34 are provided. A head cartridge 36 can be installed on the carriage shaft 34. The head cartridge 36 is provided with recording heads 38 and 40 and is so constructed that an ink cartridge 42 is set. Inks (not illustrated) are ejected toward the recording medium 32 from the recording heads 38 and 40 while the head cartridge 36 is being carried in a main scanning direction along the carriage shaft 34. The recording medium 32 is then conveyed in a sub scanning direction by the conveyance unit (not illustrated), whereby an image is recorded on the recording medium 32.

EXAMPLES

Next, the present invention is described in more detail by way of Examples and Comparative Examples. However, the present invention is by no means limited to Examples below, and various modifications are possible without departing from the gist of the present invention. It should be noted that, in the description of the amounts of components, "part(s)" and "%" are by mass unless otherwise specified.

Synthesis of Coloring Material

Compound A

A compound represented by the following structural formula (1) was synthesized as a free acid form with reference to the description of International Patent WO2006/051850A. After that, ion exchange was performed in accordance with an ordinary method to provide a compound of a sodium salt form (the compound is written as "Compound A").

(1)

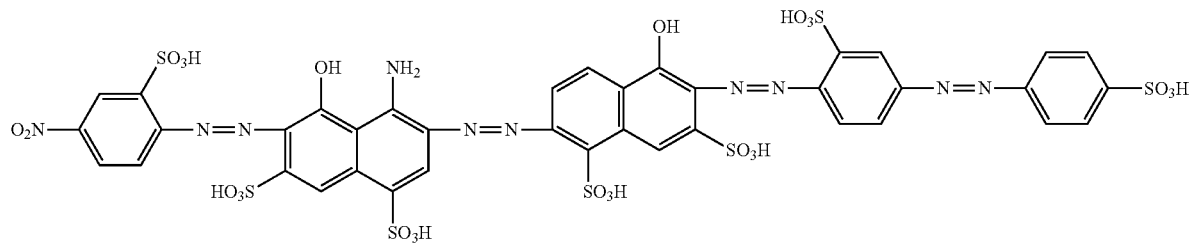

Compound B

A compound represented by the following structural formula (2) was synthesized as a free acid form with reference to the description of International Patent WO2006/051850A. After that, ion exchange was performed in accordance with an ordinary method to provide a compound of a sodium salt form (the compound is written as "Compound B").

(2)

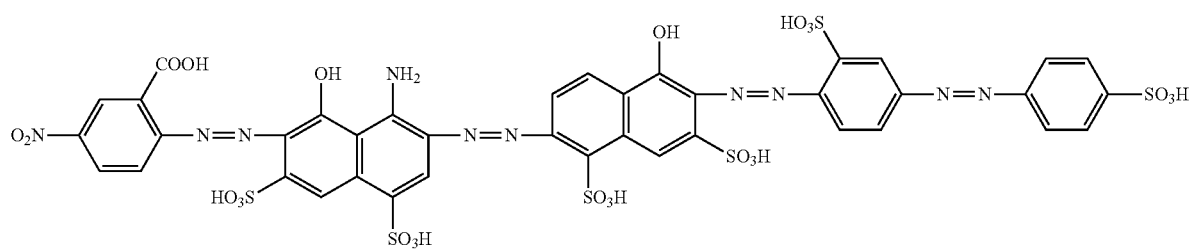

Compound C

A compound represented by the following structural formula (3) was synthesized as a free acid form with reference to the description of International Patent WO2006/051850A. After that, ion exchange was performed in accordance with an ordinary method to provide a compound of a sodium salt form (the compound is written as "Compound C").

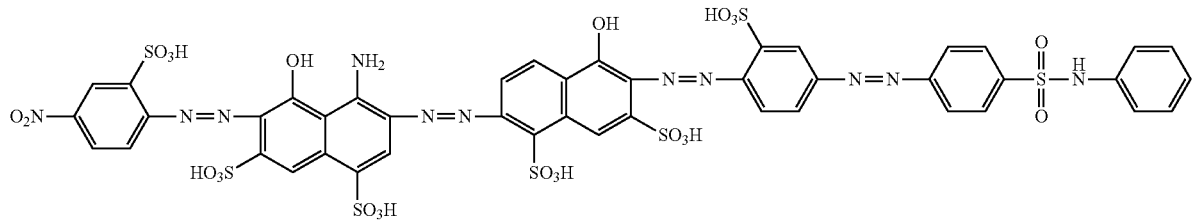

(3)

Compound D

A compound represented by the following structural formula (4) was synthesized as a free acid form with reference to the description of International Patent WO2005/108502A. After that, ion exchange was performed in accordance with an ordinary method to provide a compound of a sodium salt form (the compound is written as "Compound D").

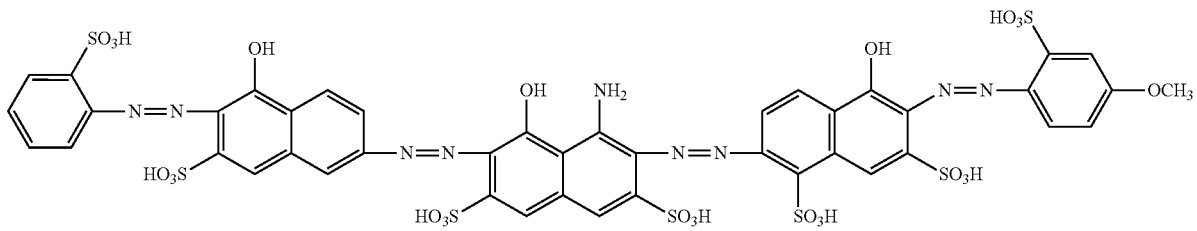

(4)

Compound E

A compound represented by the following structural formula (5) was synthesized as a free acid form with reference to the description of International Patent WO2005/097912A. After that, ion exchange was performed in accordance with an ordinary method to provide a compound of a sodium salt form (the compound is written as "Compound E").

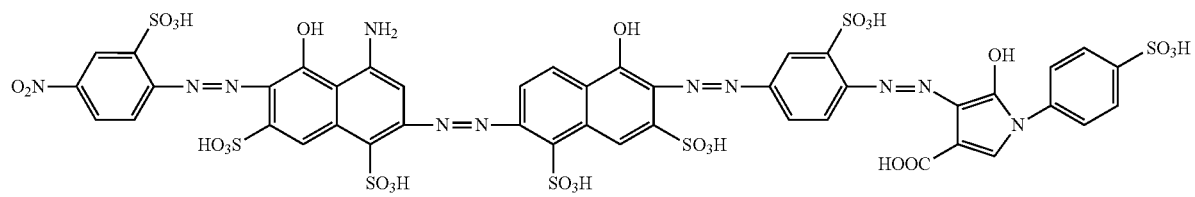

(5)

Compound F

A compound represented by the following structural formula (6) was synthesized as a free acid form with reference to the description of Japanese Patent Application Laid-Open No. 2003-201412. After that, ion exchange was performed in accordance with an ordinary method to provide a compound of a sodium salt form (the compound is written as "Compound F").

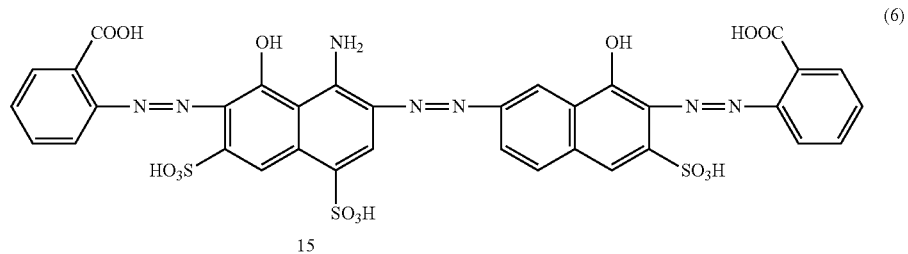

(6)

Compound G

A compound represented by the following structural formula (7) was synthesized as a free acid form with reference to the description of International Patent WO2007/077931A. After that, ion exchange was performed in accordance with an ordinary method to provide a compound of a sodium salt form (the compound is written as "Compound G").

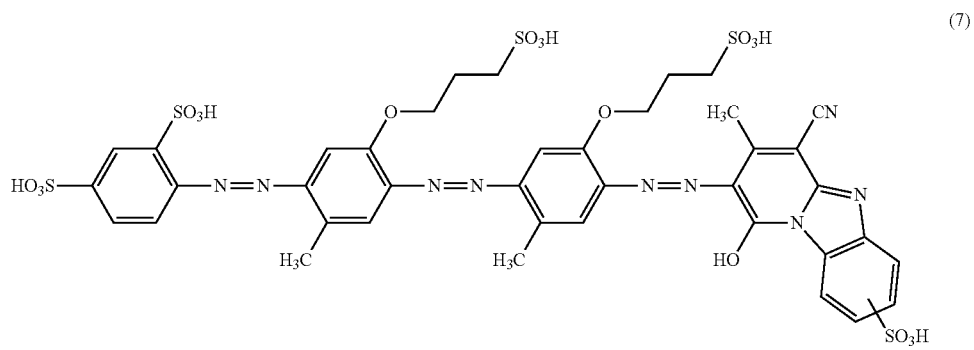

(7)

Compound H

A compound represented by the following structural formula (8) was synthesized as a free acid form with reference to the description of Japanese Patent Application Laid-Open No. 2013-072061. After that, ion exchange was performed in accordance with an ordinary method to provide a compound of a sodium salt form (the compound is written as "Compound H").

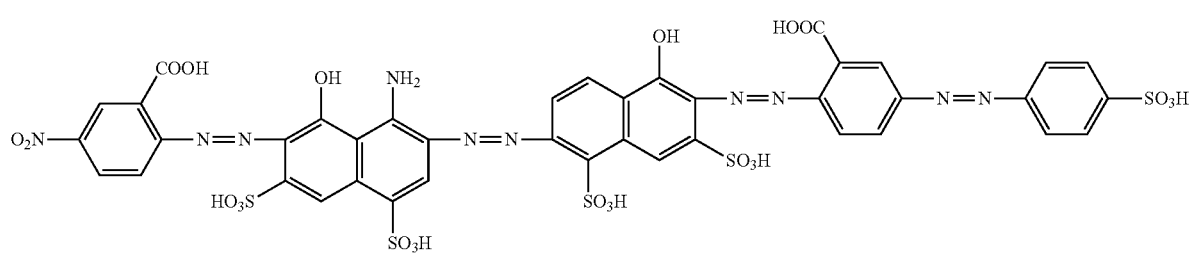

(8)

Compound I

A compound represented by the following structural formula (9) was synthesized as a free acid form with reference to the description of International Patent WO2006/001274A. After that, ion exchange was performed in accordance with an ordinary method to provide a compound of a sodium salt form (the compound is written as "Compound I").

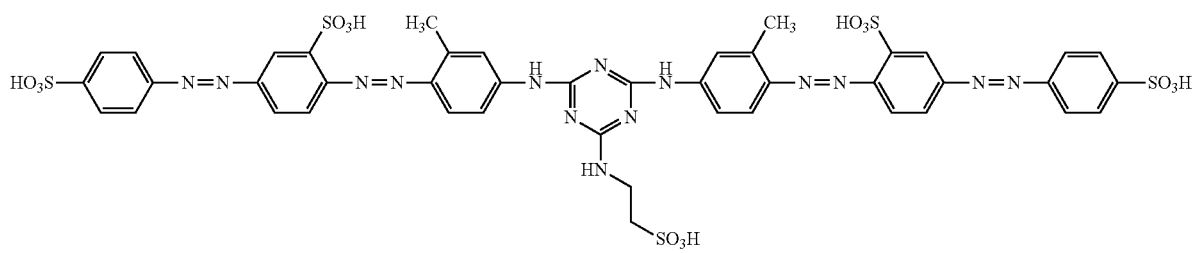

(9)

Preparation of Ink

The components (unit: %) shown in the upper part of Table 2 were mixed and sufficiently stirred. After that, the mixture was filtered with a filter having a pore size of 0.20 μm under pressure to prepare each ink. It should be noted that "Acetylenol E100" (manufactured by Kawaken Fine Chemicals Co., Ltd.) and "Surfynol 105" (manufactured by Nisshin Chemical Industry Co., Ltd.) in Table 1 are the trade names of nonionic surfactants. In addition, the lower part of Table 1 shows the content C (%) of the compound represented by the general formula (I) in the ink, the content A (%) of the compound represented by the general formula (II) therein, and the content B (%) of the linear both-terminal alkanediol having 4 to 6 carbon atoms (written as "specific alkanediol") therein. Further, the lower part of Table 1 shows a value of the ratio A/B and a value of the ratio C/(A+B).

TABLE 2

Compositions and Characteristics of Inks

| | Example | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Compound A | 4.0 | 4.0 | 4.0 | 4.0 | 4.0 | 4.0 | | 2.2 | 2.4 | 5.2 | 5.3 | 4.0 | 4.0 | 4.0 | 4.0 | 4.0 | |
| Compound B | | | | | | | 4.0 | | | | | | | | | | 3.0 |
| Compound C | | | | | | | | | | | | | | | | | |
| Compound D | | | | | | | | | | | | | | | | | |
| Compound E | | | | | | | | | | | | | | | | | |
| Compound F | | | | | | | | | | | | | | | | | |
| Compound G | | | | | | | | | | | | | | | | | |
| Compound H | | | | | | | | | | | | | | | | | |
| Compound I | 1.5 | 1.5 | 1.5 | 1.5 | 1.5 | 1.5 | 1.5 | 3.3 | 3.1 | 0.3 | 0.2 | 1.5 | 1.5 | 1.5 | 1.5 | | |
| Bis(2-hydroxyethyl)sulfone | 10.0 | 4.0 | 12.0 | 10.0 | 10.0 | 8.0 | 10.0 | 12.0 | 12.0 | 4.0 | 4.0 | | | 10.0 | 10.0 | 10.0 | |
| Thiodiethanol | | | | | | | | | | | | 10.0 | | | | | 5.5 |
| Dimethyl sulfone | | | | | | | | | | | | | 10.0 | | | | |
| 1,3-Propanediol | | | | | | | | | | | | | | | | | |
| 1,4-Butanediol | | | | | | | | | | | | | | 3.0 | | | |
| 1,5-Pentanediol | 3.0 | 1.2 | 3.6 | 4.0 | 2.5 | 3.0 | 3.0 | 3.6 | 3.6 | 1.2 | 1.2 | 3.0 | 3.0 | | | 3.0 | |
| 1,6-Hexanediol | | | | | | | | | | | | | | | 3.0 | | 1.5 |
| 1,7-Heptanediol | | | | | | | | | | | | | | | | | |
| 1,2-Hexanediol | | | | | | | | | | | | | | | | | |
| 3-Methyl-1,5-pentanediol | | | | | | | | | | | | | | | | | |
| 1,2,6-Hexanetriol | | | | | | | | | | | | | | | | | |
| Glycerin | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 |
| Triethylene glycol | | | | | | | | | | | | | | | | | |
| 2-Pyrrolidone | | | | | | | | | | | | | | | | | |
| N-methyl-2-pyrrolidone | | | | | | | | | | | | | | | | | |
| Urea | | | | | | | | | | | | | | | | | |
| Isopropyl alcohol | | | | | | | | | | | | | | | | | |
| Butyl carbitol | | | | | | | | | | | | | | | | | |
| Acetylenol E100 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Surfynol 105 | | | | | | | | | | | | | | | | | |
| Ion-exchanged water | 74.0 | 81.8 | 71.4 | 73.0 | 74.5 | 76.0 | 74.0 | 71.4 | 71.4 | 81.8 | 81.8 | 74.0 | 74.0 | 74.0 | 74.0 | 75.5 | 82.5 |
| Content C (%) of compound represented by general formula (I) | 4.0 | 4.0 | 4.0 | 4.0 | 4.0 | 4.0 | 4.0 | 2.2 | 2.4 | 5.2 | 5.3 | 4.0 | 4.0 | 4.0 | 4.0 | 4.0 | 3.0 |
| Content A (%) of compound represented by general formula (II) | 10.0 | 4.0 | 12.0 | 10.0 | 10.0 | 8.0 | 10.0 | 12.0 | 12.0 | 4.0 | 4.0 | 10.0 | 10.0 | 10.0 | 10.0 | 10.0 | 5.5 |
| Content B (%) of specific alkanediol | 3.0 | 1.2 | 3.6 | 4.0 | 2.5 | 3.0 | 3.0 | 3.6 | 3.6 | 1.2 | 1.2 | 3.0 | 3.0 | 3.0 | 3.0 | 3.0 | 1.5 |
| Value of A/B | 3.3 | 3.3 | 3.3 | 2.5 | 4.0 | 2.7 | 3.3 | 3.3 | 3.3 | 3.3 | 3.3 | 3.3 | 3.3 | 3.3 | 3.3 | 3.3 | 3.7 |
| Value of C/(A + B) | 0.31 | 0.77 | 0.26 | 0.29 | 0.32 | 0.36 | 0.31 | 0.14 | 0.15 | 1.00 | 1.02 | 0.31 | 0.31 | 0.31 | 0.31 | 0.31 | 0.43 |

TABLE 2-continued

Compositions and Characteristics of Inks

| | Comparative Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Compound A | | | | | | | 4.0 | 4.0 | 4.0 | 4.0 | 4.0 | 4.0 | 4.0 | 4.0 |
| Compound B | | | | | | | | | | | | | | |
| Compound C | 4.0 | | | | | | | | | | | | | |
| Compound D | | 4.0 | | | | | | | | | | | | |
| Compound E | | | 4.0 | | | | | | | | | | | |
| Compound F | | | | 4.0 | | | | | | | | | | |
| Compound G | | | | | 4.0 | | | | | | | | | |
| Compound H | | | | | | 4.0 | | | | | | | | |
| Compound I | 1.5 | 1.5 | 1.5 | 1.5 | 1.5 | 1.5 | 1.5 | 1.5 | 1.5 | 1.5 | 1.5 | 1.5 | 1.5 | 1.5 |
| Bis(2-hydroxyethyl)sulfone | 10.0 | 10.0 | 10.0 | 10.0 | 10.0 | 10.0 | | | | | | 10.0 | 10.0 | 10.0 |
| Thiodiethanol | | | | | | | | | | | | | | |
| Dimethyl sulfone | | | | | | | | | | | | | | |
| 1,3-Propanediol | | | | | | | | | | | | 3.0 | | |
| 1,4-Butanediol | | | | | | | | | | | | | | |
| 1,5-Pentanediol | 3.0 | 3.0 | 3.0 | 3.0 | 3.0 | 3.0 | 13.0 | 3.0 | 3.0 | 3.0 | 3.0 | | | |
| 1,6-Hexanediol | | | | | | | | | | | | | | |
| 1,7-Heptanediol | | | | | | | | | | | | | 3.0 | |
| 1,2-Hexanediol | | | | | | | | | | | | | | 3.0 |
| 3-Methyl-1,5-pentanediol | | | | | | | | | | | | | | |
| 1,2,6-Hexanetriol | | | | | | | | | | | | | | |
| Glycerin | 7.0 | 7.0 | 7.0 | 7.0 | 7.0 | 7.0 | 7.0 | 7.0 | 7.0 | 7.0 | 7.0 | 7.0 | 7.0 | 7.0 |
| Triethylene glycol | | | | | | | | | | 10.0 | | | | |
| 2-Pyrrolidone | | | | | | | | | | | 10.0 | | | |
| N-methyl-2-pyrrolidone | | | | | | | | | | | | | | |
| Urea | | | | | | | | | | | 10.0 | | | |
| Isopropyl alcohol | | | | | | | | | | | | | | |
| Butyl carbitol | | | | | | | | | | | | | | |
| Acetylenol E100 | 0.5 | 0.5 | 0.5 | 0.5 | 0.5 | 0.5 | 0.5 | 0.5 | 0.5 | 0.5 | 0.5 | 0.5 | 0.5 | 0.5 |
| Surfynol 105 | | | | | | | | | | | | | | |
| Ion-exchanged water | 74.0 | 74.0 | 74.0 | 74.0 | 74.0 | 74.0 | 74.0 | 74.0 | 74.0 | 74.0 | 74.0 | 74.0 | 74.0 | 74.0 |
| Content C (%) of compound represented by general formula (I) | 0.0 | 0.0 | 0.0 | 0.0 | 0.0 | 0.0 | 4.0 | 4.0 | 4.0 | 4.0 | 4.0 | 4.0 | 4.0 | 4.0 |
| Content A (%) of compound represented by general formula (II) | 10.0 | 10.0 | 10.0 | 10.0 | 10.0 | 10.0 | 0.0 | 0.0 | 0.0 | 0.0 | 0.0 | 10.0 | 10.0 | 10.0 |
| Content B (%) of specific alkanediol | 3.0 | 3.0 | 3.0 | 3.0 | 3.0 | 3.0 | 13.0 | 3.0 | 3.0 | 3.0 | 3.0 | 0.0 | 0.0 | 0.0 |
| Value of A/B | 3.3 | 3.3 | 3.3 | 3.3 | 3.3 | 3.3 | 0.0 | 0.0 | 0.0 | 0.0 | 0.0 | — | — | — |
| Value of C/(A + B) | 0.00 | 0.00 | 0.00 | 0.00 | 0.00 | 0.00 | 0.31 | 1.33 | 1.33 | 1.33 | 1.33 | 0.40 | 0.40 | 0.40 |

| | Comparative Example | | | | | | |
|---|---|---|---|---|---|---|---|
| | 15 | 16 | 17 | 18 | 19 | 20 | 21 |
| Compound A | 4.0 | 4.0 | 4.0 | 4.0 | 4.0 | 4.0 | 5.5 |
| Compound B | | | | | | | |
| Compound C | | | | | | | |
| Compound D | | | | | | | |
| Compound E | | | | | | | |
| Compound F | | | | | | | |
| Compound G | | | | | | | |
| Compound H | | | | | | | |
| Compound I | 1.5 | 1.5 | 1.5 | 1.5 | 1.5 | 1.5 | |
| Bis(2-hydroxyethyl)sulfone | 10.0 | 10.0 | 3.0 | 13.0 | 10.0 | 10.0 | |
| Thiodiethanol | | | | | | | |
| Dimethyl sulfone | | | | | | | |
| 1,3-Propanediol | | | | | | | |
| 1,4-Butanediol | | | | | | | |
| 1,5-Pentanediol | | | 1.0 | 3.9 | 4.1 | 2.4 | |
| 1,6-Hexanediol | | | | | | | |
| 1,7-Heptanediol | | | | | | | |
| 1,2-Hexanediol | | | | | | | |
| 3-Methyl-1,5-pentanediol | 3.0 | | | | | | |
| 1,2,6-Hexanetriol | | 3.0 | | | | | |
| Glycerin | 7.0 | 7.0 | 7.0 | 7.0 | 7.0 | 7.0 | 5.0 |
| Triethylene glycol | | | | | | | |
| 2-Pyrrolidone | | | | | | | |
| N-methyl-2-pyrrolidone | | | | | | | 4.0 |
| Urea | | | | | | | 5.0 |
| Isopropyl alcohol | | | | | | | 3.0 |
| Butyl carbitol | | | | | | | 2.0 |

TABLE 2-continued

Compositions and Characteristics of Inks

| | | | | | | | |
|---|---|---|---|---|---|---|---|
| Acetylenol E100 | 0.5 | 0.5 | 0.5 | 0.5 | 0.5 | 0.5 | |
| Surfynol 105 | | | | | | | 0.1 |
| Ion-exchanged water | 74.0 | 74.0 | 83.0 | 70.1 | 72.9 | 74.6 | 75.4 |
| Content C (%) of compound represented by general formula (I) | 4.0 | 4.0 | 4.0 | 4.0 | 4.0 | 4.0 | 5.5 |
| Content A (%) of compound represented by general formula (II) | 10.0 | 10.0 | 3.0 | 13.0 | 10.0 | 10.0 | 0.0 |
| Content B (%) of specific alkanediol | 0.0 | 0.0 | 1.0 | 3.9 | 4.1 | 2.4 | 0.0 |
| Value of A/B | — | — | 3.0 | 3.3 | 2.4 | 4.2 | — |
| Value of C/(A + B) | 0.40 | 0.40 | 1.00 | 0.24 | 0.28 | 0.32 | — |

Evaluation

Each of the inks obtained in the foregoing was filled into an ink cartridge, and the cartridge was mounted on an ink jet recording apparatus configured to eject an ink from a recording head through the action of thermal energy (trade name: "PIXUS iP8600", manufactured by Canon Inc.). In this example, a solid image recorded by applying 2.5 pL of the ink to a unit region measuring ½,₄₀₀ inch by ¹⁄₁,₂₀₀ inch is defined as a recording duty of 100%. Upon evaluations of the image for its optical density and ozone resistance, the optical density was measured with a spectrophotometer (trade name: "Spectrolino", manufactured by Gretag Macbeth) under the conditions of a light source of D50 and a field of view of 2°. In the present invention, evaluation criteria for each of the following items were defined as follows: a criterion "C" was an unacceptable level, and criteria "AA", "A", and "B" were acceptable levels. Table 3 shows the results of the evaluations.

Optical Density

A solid image having a recording duty of 100% was recorded on a recording medium (plain paper, trade name: "PB PAPER", manufactured by Canon Inc.) with the ink jet recording apparatus under the environment of a temperature of 23° C. and a relative humidity of 55%. The optical density of the solid image of the resultant recorded product was measured. The resultant value for the optical density was evaluated in accordance with the following evaluation criteria.

AA: The optical density was 1.30 or more.
A: The optical density was 1.25 or more and less than 1.30.
B: The optical density was 1.15 or more and less than 1.25.
C: The optical density was less than 1.20.

Ozone Resistance

A solid image having a recording duty of 50% was recorded on a recording medium (glossy paper, trade name: "Canon Photographic Paper-Gloss Gold", manufactured by Canon Inc.) with the ink jet recording apparatus under the environment of a temperature of 23° C. and a relative humidity of 55%. The optical density of the solid image of the resultant recorded product was measured (an optical density before an ozone resistance test). The recorded product was placed in an ozone tester (trade name: "OMS-H", manufactured by Suga Test Instruments Co., Ltd.), and was exposed to ozone at a temperature in a tank of 23° C., a relative humidity of 50%, and an ozone gas concentration of 10 ppm for 24 hours. After that, the optical density of the solid image of the recorded product was measured (an optical density after the ozone resistance test). An optical density residual ratio was calculated by using the resultant values for the optical density before the ozone resistance test and the optical density after the ozone resistance test from the expression (optical density after ozone resistance test)/(optical density before ozone resistance test)×100%, and the ozone resistance was evaluated in accordance with the following evaluation criteria. It should be noted that the optical density residual ratio was calculated for each of a black component, yellow component, magenta component, and cyan component subjected to measurement with the spectrophotometer, and the lowest value was used in the evaluation.

A: The optical density residual ratio was 68% or more.
B: The optical density residual ratio was 60% or more and less than 68%.
C: The optical density residual ratio was less than 60%.

Humidity Resistance

A solid image having a recording duty of 100% was recorded on a recording medium (glossy paper, trade name: "Canon Photographic Paper-Gloss Pro [Platinum Grade]", manufactured by Canon Inc.) with the ink jet recording apparatus under the environment of a temperature of 23° C. and a relative humidity of 55%. The resultant recorded product was dried in the environment of a temperature of 23° C. and a relative humidity of 55% for 24 hours, and then the condition of the blurring of the solid image was visually observed (a condition before a humidity resistance test). After that, the recorded product was placed in the environment of a temperature of 25° C. and a relative humidity of 85% for 1 week, and was further placed in the environment of a temperature of 23° C. and a relative humidity of 55% for 24 hours. After that, the condition of the blurring of the solid image was visually observed (a condition after the humidity resistance test). Then, the conditions before and after the humidity resistance test were compared, and the humidity resistance of the solid image was evaluated in accordance with the following evaluation criteria.

A: The conditions of the blurring of the solid image before and after the humidity resistance test were equivalent to each other.
B: The solid image after the humidity resistance test blurred to a larger extent than the image before the humidity resistance test did, but its contour was not disturbed.
C: The solid image after the humidity resistance test blurred to a larger extent than the image before the humidity resistance test did, and its contour was disturbed.

Sticking Resistance

The ink cartridge filled with each ink was mounted on the head cartridge of the ink jet recording apparatus, and the head cartridge was filled with the ink so that the ink reached the ejection orifices of its recording head. After that, the head cartridge was removed from the ink jet recording apparatus, and was placed under the environment of a temperature of 35° C. and a relative humidity of 10% for 2 weeks in a state in which the ejection orifices were exposed. After that, the head cartridge was mounted on the ink jet recording apparatus again. Then, the ejection condition of the ink after the performance of a predetermined number of times of a recovery operation was checked, and the sticking resistance of the ink was evaluated in accordance with the following evaluation criteria. It should be noted that the recovery operation refers to "cleaning of the print head" of the ink jet recording apparatus.

A: All ejection orifices were recovered to such a condition that the orifices were able to eject the ink normally by four or less times of the recovery operation.
B: All ejection orifices were recovered to such a condition that the orifices were able to eject the ink normally by five times of the recovery operation.
C: Some of the ejection orifices could not eject the ink normally even after the performance of six or more times of the recovery operation.

TABLE 3

Results of Evaluations

|  |  | Optical density | Ozone resistance | Humidity resistance | Sticking resistance |
|---|---|---|---|---|---|
| Example | 1 | AA | A | A | A |
|  | 2 | AA | A | A | A |
|  | 3 | AA | A | A | A |
|  | 4 | AA | A | A | A |
|  | 5 | AA | A | A | A |
|  | 6 | AA | A | A | A |
|  | 7 | AA | A | A | B |
|  | 8 | AA | A | B | A |
|  | 9 | AA | A | A | A |
|  | 10 | AA | A | A | A |
|  | 11 | AA | A | A | B |
|  | 12 | AA | A | A | B |
|  | 13 | AA | A | A | B |
|  | 14 | A | A | A | A |
|  | 15 | A | A | A | A |
|  | 16 | AA | A | A | B |
|  | 17 | A | A | B | B |
| Comparative Example | 1 | C | A | A | C |
|  | 2 | B | C | A | A |
|  | 3 | C | A | A | A |
|  | 4 | A | C | A | A |
|  | 5 | C | A | A | A |
|  | 6 | A | A | A | C |
|  | 7 | AA | A | A | C |
|  | 8 | AA | A | A | C |
|  | 9 | AA | A | A | C |
|  | 10 | AA | A | A | C |
|  | 11 | AA | A | C | B |
|  | 12 | AA | A | C | A |
|  | 13 | A | A | A | C |
|  | 14 | C | A | A | A |
|  | 15 | C | A | A | A |
|  | 16 | A | A | C | A |
|  | 17 | AA | A | A | C |
|  | 18 | AA | A | C | A |
|  | 19 | AA | A | A | C |
|  | 20 | AA | A | C | A |
|  | 21 | A | A | C | C |

It should be noted that the sticking resistances of Examples 2 and 10 were lower than those of the other examples ranked as A.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-060735, filed Mar. 24, 2014, which is hereby incorporated by reference herein in its entirety.

What is claimed is:

1. An ink for ink jet, the ink comprising:
a coloring material; and
a water-soluble organic solvent,
wherein the coloring material includes a compound represented by the following general formula (III),
wherein the water-soluble organic solvent includes bis(2-hydroxyethyl)sulfone and 1,5-pentanediol,
wherein a content A (mass %) of the bis(2-hydroxyethyl)sulfone based on the total mass of the ink is 8.0 mass % or more and 12.0 mass % or less,
wherein a content B (mass %) of the 1,5-pentanediol based on the total mass of the ink is 1.0 mass % or more and 5.0 mass % or less,
wherein a content C (mass %) of the compound represented by the general formula (III) based on the total mass of the ink is 0.1 mass % or more and 10.0 mass % or less, and
wherein a mass ratio (AB) of the content A (mass %) to the content B (mass %) is 2.5 times or more and 4.0 times or less:

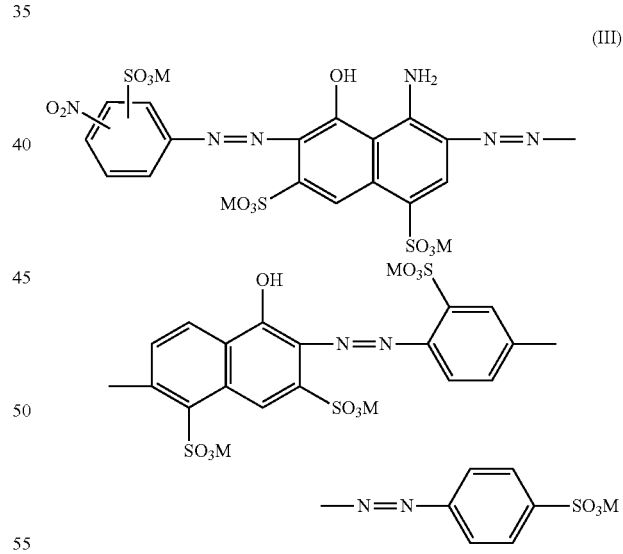

in the general formula (III):
M's each independently represent a hydrogen atom, an alkali metal, ammonium, or an organic ammonium.

2. An ink according to claim 1, wherein a mass ratio (C/(A+B)) of the content C (mass %) to a sum of the content A (mass %) and the content B (mass %) is 0.15 times or more and 1.00 times or less.

3. An ink according to claim 1, wherein the coloring material further includes a compound represented by the following general formula (IV):

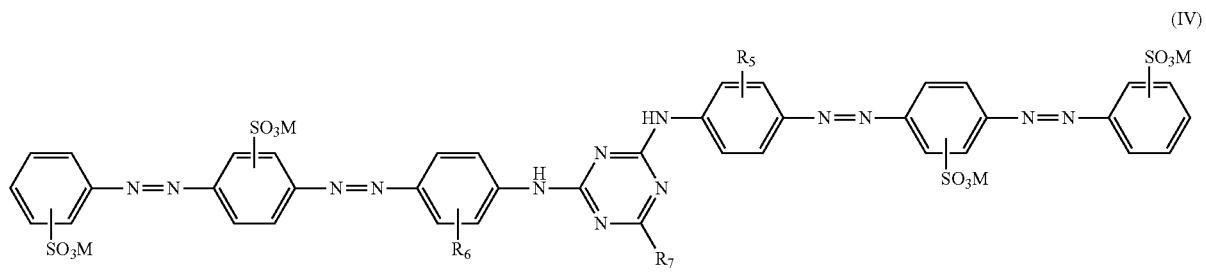

in the general formula (IV):

$R_6$'s each independently represent a hydrogen atom or an alkyl group;

$R_7$ represents an aliphatic amine residue having at least one of a carboxylic acid group and a sulfonic acid group; and M's each independently represent a hydrogen atom, an alkali metal, ammonium, or an organic ammonium.

4. An ink according to claim 3, wherein a content D (mass %) of the compound represented by the general formula (IV) based on the total mass of the ink is 0.1 mass % or more and 10.0 mass % or less.

5. An ink according to claim 3, wherein a mass ratio (C/D) of the content C (mass %) to a content D (mass %) of the compound represented by the general formula (IV) based on the total mass of the ink is 0.8 times or more and 18.0 times or less.

6. An ink according to claim 3, wherein a mass ratio (C/D) of the content C (mass %) to a content D (mass %) of the compound represented by the general formula (IV) based on the total mass of the ink is 2.7 times or more and 3.5 times or less.

7. An ink cartridge, comprising an ink and an ink storage portion storing the ink, wherein the ink comprises the ink according to claim 1.

8. An ink jet recording method, comprising ejecting an ink from a recording head of an ink jet system to record an image on a recording medium, wherein the ink comprises the ink according to claim 1.

* * * * *